United States Patent [19]
Fuzesi et al.

[11] 3,933,698
[45] Jan. 20, 1976

[54] PREPARATION OF LOW FRIABILITY RIGID POLYURETHANE FOAM

[75] Inventors: Stephen Fuzesi; Allan H. Syrop, both of Hamden, Conn.

[73] Assignee: Olin Corporation, New Haven, Conn.

[22] Filed: Sept. 23, 1974

[21] Appl. No.: 508,542

[52] U.S. Cl. .................. 260/2.5 AS; 260/2.5 AM; 260/2.5 AQ
[51] Int. Cl.$^2$ .................. C08G 18/14; C08G 18/50
[58] Field of Search ... 260/2.5 AS, 2.5 AM, 2.5 AQ

[56] References Cited
UNITED STATES PATENTS

| | | | |
|---|---|---|---|
| 3,419,532 | 12/1968 | Jackson | 117/138.8 D |
| 3,424,700 | 1/1969 | Booth | 260/2.5 AQ |
| 3,442,888 | 5/1969 | Degginger | 260/2.5 AS |
| 3,471,416 | 10/1969 | Fijal | 260/2.5 AQ |
| 3,630,973 | 12/1971 | Ardis | 260/2.5 AM |
| 3,655,588 | 4/1972 | Mosso | 260/2.5 AQ |
| 3,763,111 | 10/1973 | Fijal | 260/77.5 AS |
| 3,847,844 | 11/1974 | Fuzesi | 260/2.5 AS |

*Primary Examiner*—C. Warren Ivy
*Attorney, Agent, or Firm*—F. A. Iskander; T. P. O'Day

[57] ABSTRACT

An improvement is disclosed in the preparation of rigid polyurethane foams which have relatively high surface friability. The improvement resides in the use of a select group of amine-based polyols to reduce the friability of the resulting foam.

18 Claims, No Drawings

PREPARATION OF LOW FRIABILITY RIGID POLYURETHANE FOAM

This invention relates to an improvement in the production of polyurethane foam. More particularly, the invention relates to the reduction of surface friability in rigid polyurethane foams.

It is known in the art that polyether polyols which are derived from 4,4,4-trichloro-1,2-epoxybutane can be used to advantage in the preparation of a highly flame retardant, rigid polyurethane foam. See for example U.S. Pat. Nos. 3,269,961, 3,630,973 and 3,741,921.

However, it has recently been learned that the use of certain such polyols yields a foam which is often plagued with a high degree of surface friability. As such, the foam requires special handling and it cannot be used to advantage, if at all, in those applications in which the foam is sprayed onto, and is required to adhere to, certain surfaces such as in the on-site insulation of homes and industrial structures.

Now an improvement has been found for eliminating or minimizing the surface friability of rigid otherwise friable polyurethane foam. This objective is achieved, according to the invention, by including in the foam forming reaction mixture a second polyol comprised of a hydroxy-terminated adduct of alkylene oxide and an amine initiator, in which adduct substantially all the hydroxy groups are primary.

The improvement disclosed herein may be utilized in reducing the friability of any rigid polyurethane foam which is characterized by a relatively high degree of surface friability. However, it is preferred to employ the improvement of the invention in connection with the preparation of those rigid polyurethane foams which are prepared from a reaction mixture comprised of an organic polyisocyanate, a foaming agent, a reaction catalyst and, as the main reactive polyol, an adduct of a polyhydroxy compound and 4,4,4-trichloro-1,2-epoxybutane. This adduct, hereinafter referred to as the "main polyol reactant," may be prepared by methods well known in the art. For example, it can be prepared by condensing, optionally in the presence of an oxyalkylation catalyst, a polyhydroxy initiator compound with 4,4,4-trichloro-1,2-epoxybutane.

Although any polyhydroxy compound may be employed in preparing the main polyol reactant, it is preferred to employ a polyhydroxy compound which comprises a carbohydrate or a carbohydrate derivative. Illustrative are sucrose, dextrose, and mixtures of sucrose or dextrose with water and/or with an aliphatic diol or triol. Exemplificative of the latter are ethylene glycol, propylene glycol, the butylene glycols, glycerol, trimethylolpropane, triethylolpropane, mixtures thereof and the like.

A particularly preferred group of initiators for use in preparing the main polyol reactant is that selected from the group consisting of a mixture of dextrose and water, a mixture of dextrose and an aliphatic diol or triol, and a mixture of dextrose, water and an aliphatic diol or triol. Any suitable molar ratio of dextrose to water and/or diol or triol may be used in preparing such mixtures. For example at least about 0.6, and preferably about 0.9–3 moles each of water and/or diol or triol may be employed per mole of dextrose. A more detailed description concerning the preparation of these mixtures is provided in U.S. Pat. No. 3,741,921, issued June 26, 1973 to M. Lapkin, the entire disclosure of which is incorporated by reference herein. As used in the specification and claims herein, the term "dextrose" is intended to include hydrous dextrose, such as $\alpha$-d-glucose monohydrate, as well as anhydrous dextrose, e.g., d-glucose. In accordance with the most preferred embodiments of the invention a mixture of dextrose and an aliphatic diol or triol is used as the initiator.

The 4,4,4-trichloro-1,2-epoxybutane may be used in purified form, as a crude product of the dehydrohalogenation of 4,4,4-trichloro-2-halobutanol, or as a mixture with a nonhalogenated alkylene oxide, e.g., ethylene oxide, propylene oxide, butylene oxide and mixtures thereof. Thus the term "4,4,4-trichloro-1,2-epoxybutane" as used in the specification and claims herein includes any such materials and mixtures which are suitable for condensation with a polyhydroxy initiator to form a polyol that is useful in the production of polyurethane foam.

In preparing the main polyol reactant, a wide variety of conventional oxyalkylation catalysts may be employed, if desired, to promote the condensation reaction between the 4,4,4-trichloro-1,2-epoxybutane and the polyhydroxy initiator. However, when a catalyst is used it is preferred to use an acid catalyst such as a Lewis acid, e.g., boron trifluoride or an etherate derivative thereof. Usually carried out at a temperature of about 30°–200°C, the condensation reaction is allowed to proceed until a polyether polyol is obtained which has a hydroxyl number from about 150 to about 800, preferably about 260–550, and more preferably about 300–450.

Pursuant to the method of the invention, the polyurethane foam is prepared from a reaction mixture comprising a main polyol reactant, as described above, and a select second polyol. This second polyol, the use of which is critical to reducing the friability of the foam according to the invention, is hereinafter referred to as the "supplemental polyol."

As indicated above, the supplemental polyol is comprised of a hydroxyl-terminated adduct of alkylene oxide and an amine, in which adduct substantially all the hydroxy groups are primary groups. Such a supplemental polyol may be prepared by condensing, in the presence of an oxyalkylation catalyst, an amine initiator with alkylene oxide.

Any suitable amine initiator, including mixtures of initiators containing an amine, may be employed in preparing the supplemental polyol. Suitable amines include the following and mixtures thereof:

a. The primary aliphatic amines including mono-, di-, and triamines. These amines usually contain 1–8, and preferably 1–4, carbon atoms such as methylamine, ethylamine, n-propylamine, n-butylamine, n-amylamine, n-hexylamine, ethylene diamine, diaminopropane, diaminobutane, pentamethylene diamine, diethylene triamine, and mixtures thereof. Particularly preferred amines in this group are the diamines having 2–4 carbon atoms such as ethylene diamine.

b. The primary aromatic amines including mono-, di-, and triamines. Preferably these contain 6–8 carbon atoms such as aniline, methylaniline, phenylene diamine, toluene diamine and triaminobenzene. A particularly preferred amine in this group is toluene diamine which may be any isomer, such as 2,3-, 2,4-, and 2,6-toluene diamine, or a mixture of such isomers.

c. The alkanolamines, i.e., the aliphatic hydroxy amines. Usually each alkanol group in these amines contains from 2 to 5 carbon atoms. Illustrative are ethanolamine, diethanolamine, triethanolamine, the mono-, di-, and tripropanolamines, ethanolpropanolamine, diethanolpropanolamine, and the mono-, di-, and tributanolamines. Particularly preferred alkanolamines are those in which each alkanol group contains 2–3 carbon atoms such as the ethanolamines, the propanolamines and the ethanaolpropanolamines.

The most preferred amines referred to above are selected from the group consisting of ethylene diamine, diaminopropane, toluene diamine, an ethanolamine such as mono-, di-, and triethanolamine, a propanolamine such as mono-, di-, and tripropanolamine, an ethanolpropanolamine such as monoethanolmonopropanolamine and diethanolpropanolamine, and mixtures of these amines.

An amine initiator as described above is condensed with alkylene oxide in preparing the supplemental polyol. Any suitable alkylene oxide, such as ethylene oxide, propylene oxide, butylene oxide, or a mixture of alkylene oxides may be employed provided that the product polyol contains substantially only primary hydroxy groups. However, it is preferred to employ ethylene oxide alone or in combination with a higher alkylene oxide provided the oxyalkylation is carried out step-wise with ethylene oxide being the sole, final oxyalkylating agent. The use of ethylene oxide alone is most preferred, in which case the adduct would be an oxyethylated amine.

A variety of conventional oxyalkylating catalysts may be used in carrying out the amine oxyalkylation reaction. However, it is preferred to employ an alkaline catalyst such as potassium hydroxide. The oxyalkylation reaction is allowed to proceed, using usually elevated temperatures, until a polyether polyol product is obtained which has a hydroxyl number of about 100–800 and preferably about 250–600. The reaction is then terminated and the product is recovered for use as a supplemental polyol according to the invention.

Any suitable proportion of the supplemental polyol may be employed which is effective in reducing the friability of the foam without otherwise interfering with, or detrimentally altering, its properties. Usually a proportion is used which ranges from about 8 to about 50, preferably about 10–40, and more preferably about 10–25, parts per every 100 parts by weight of the main polyol reactant. The requisite proportion of the supplemental polyol may be preparatorily blended in with the main polyol reactant or it may be added separately to the foam-forming reaction mixture.

In preparing the foams of the invention, the above described polyols are reacted with an organic polyisocyanate in the presence of a reaction catalyst and a foaming agent. Either the one-shot method or the prepolymer technique may be employed in carrying out the reaction. Any suitable organic polyisocyanate, or mixture of polyisocyanates, may be used which is capable of reacting with a polyether polyol to form a polyurethane. Illustrative are toluene dissocyanate, such as the 80:20 and the 65:35 mixtures of the 2,4:2,6-isomers, methylene-bis(4-phenylisocyanate), 3,3′-bitolylene 4,4′-diisocyanate, 3,3′-dimethoxy-4,4′-bitolylene 4,4′-dinaphthylene-1,5-diisocyanate, hexamethylene diisocyanate, polymethylene polyphenylisocyanate, and the like. The preferred isocyanates are toluene diisocyanate, polymethylene polyphenylisocyanate, and mixtures thereof. The polymethylene polyphenylisocyanate usually has a functionability of about 2.2–3.2 such as may be purchased commercially under the trademark "PAPI." The amount of isocyanate employed in the preparation of the polyurethane foams should be sufficient to provide at least about 0.9, and preferably about 1.0–1.2, NCO groups per each hydroxy group present in the foam-forming reaction system. A 100 multiple of the ratio of NCO to OH groups in the foam-forming reaction system is referred to as the "index."

The foaming agent employed in preparing the polyurethane foams can be any one of those known in the art to be useful for this purpose such as water, the halogenated hydrocarbons, and mixtures thereof. The preferred foaming agents are the halogenated hydrocarbons which include, for example, monofluorotrichloromethane, difluorodichloromethane, the trichlorotrifluoroethanes, dichlorotetrafluoroethane, methylene chloride, chloroform, carbon tetrachloride, and the like. The amount of foaming agent, or mixture of foaming agents, can be varied over a wide range. Generally, however, the halogenated hydrocarbons are employed in an amount ranging from about 1 to about 75 parts by weight per 100 parts of total polyols in the foam-forming reaction system; and generally water is employed in an amount ranging from about 0.1 to about 10 parts by weight per 100 parts of total polyols.

Any of the catalysts, or mixtures thereof, which are known in the art to catalyze the polyurethane foam-forming reaction may be employed in preparing the foams of the invention. These include the tertiary amines, such as N-methylmorpholine and triethylenediamine, and the organic metal salts such as stannous octoate and dibutyltin dilaurate. Generally the catalyst is employed in any suitable catalytic proportion such as from about 0.05 to about 3.0, and preferably from about 0.075 to about 2.0, percent by weight based on the total weight of polyols in the reaction system.

It is preferred in the preparation of the polyurethane foams of the invention to employ minor amounts of a conventional polyurethane foam surfactant. Typical of these are the silicon-based surfactants such as the silicone oils and soaps and the siloxanes. Usually the amount of surfactant ranges up to about 2 parts by weight per 100 parts of total polyols in the reaction system.

Various additives may also be incorporated in the polyurethane foam-forming reaction mixture, if desired, such as fillers, dyes, plasticizers, deodorants, and antioxidants.

The improved process of the invention provides a relatively simple and practically attractive route to resolving the problem of high surface friability in rigid polyurethane foam. Furthermore, this objective is achieved at minimum cost and without undermining or altering the other basic properties of the foam.

The polyurethane foams of the invention are of utility in a variety of commercial and industrial applications including for example the production of foam-insulated food and beverage containers, sporting goods, and like applications. They are of particular utility in those applications requiring a rigid foam which, along with being flame retardant, can be sprayed onto, and adheres to, wood and other structural materials. Such applications include the on-site generation of foam in the insulation of houses and other structural installations.

The following examples are provided to illustrate the invention. In these examples, a variety of supplemental polyols are used as indicated. Otherwise, the other foam forming ingredients are essentially the same throughout. They are as follows:

| Ingredients | Parts by Weight |
| --- | --- |
| Main polyol reactant[1] | 100.0 |
| Trifluorochloromethane foaming agent | 36.0–39.0 |
| Dimethylcyclohexylamine catalyst | 2.0 |
| Dow Corning 193 surfactant[2] | 2.0 |
| Polymethylene polyphenylisocyanate[3] | (115 index)[4] |

[1]This is a 360 hydroxyl number polyether polyol prepared by condensing, in the presence of boron trifluoride etherate catalyst, 4,4,4-trichloro-1,2-epoxybutane with an equi-molar mixture of ethylene glycol and α-d-glucose monohydrate.
[2]This is a silicone-glycol copolymer described in an August 1968 Dow Corning bulletin No. 05-146.
[3]This is a commercial product of the Upjohn Company purchased under the trademark "PAPI" and having an approximate functionability of 2.6.
[4]The proportion of isocyanate was calculated to provide in each example an index of 115.

Further in the examples, surface friability is tested by downwardly finger-rubbing the side of the foam bun, using sufficient finger pressure to form a slight indentation in the foam. The effect of this treatment is observed visually and on that basis the surface friability of the foam is rated as "high," "moderate," or "low." A high rating is given a foam which exhibits excessive surface crumbling; a moderate rating is given a foam which exhibits markedly reduced though still considerable crumbling; and a low rating indicates that the foam exhibits slight or no crumbling at all.

EXAMPLE 1

A rigid polyurethane foam was prepared from a reaction mixture consisting of the above ingredients, in the indicated proportions, and 20 parts by weight of oxyethylated diethanolamine, hydroxyl number 440, as a supplemental polyol. The ingredients were hand-mixed and foamed in a square cardboard box. After being cured, the resulting foam was removed from the box and its surface friability was tested in accordance with the test described above. The foam exhibited only slight surface crumbling and it was given a low friability rating.

COMPARISON 1

For comparison purposes, another rigid foam was prepared following the exact procedure of Example 1 except that no oxyethylated diethanolamine, or any other supplemental polyol, was included in the foam forming reaction mixture. The resulting foam exhibited excessive surface crumbling and was therefore given a high friability rating.

EXAMPLES 2–3

The procedure of Example 1 was followed in carrying out these two examples with one modification. This is that the oxyethylated diethanolamine used in Example 2 had a hydroxyl number of 597, and the oxyethylated diethanolamine used in Example 3 had a hydroxyl number of 288. In both cases the resulting foam exhibited only slight surface crumbling and thus earned a low friability rating.

EXAMPLE 4

Following the procedure of Example 1, a rigid polyurethane foam was prepared from a reaction mixture consisting of the above ingredients, in the indicated proportions, and 20 parts by weight of oxyethylated ethylene diamine, hydroxyl number 546. The resulting foam exhibited a substantial reduction in surface crumbling as compared with the foam of Comparison 1. It was thus given a moderate surface friability rating.

EXAMPLE 5

The supplemental polyol used in this example was a 537 hydroxyl number polyol prepared by the oxyethylation of an equi-molar mixture of ortho-toluene diamine and diethanolamine. Otherwise the same procedure of Example 1 was followed. The resulting rigid foam had a moderate surface friability rating.

EXAMPLE 6

The supplemental polyol used in this example was a 474 hydroxyl number polyol prepared by the oxyethylation of a mixture of sucrose and diethanolamine in a molar ratio of 2.25 moles of diethanolamine per every mole of sucrose. Otherwise again the procedure of Example 1 was followed. The resulting rigid foam had a moderate surface friability rating.

What is claimed is:

1. In a process of preparing a rigid polyurethane foam from a reaction mixture comprised of a polyether polyol reactant, an organic polyisocyanate reactant, a reaction catalyst and a forming agent, said polyether polyol reactant having a hydroxyl number of about 150–800 and being the product of condensing 4,4,4-trichloro-1,2-epoxybutane with a mixture selected from the group consisting of a mixture of dextrose and water, a mixture of dextrose and an aliphatic diol or triol, and a mixture of dextrose, water and an aliphatic diol or triol, the improvement of including in said reaction mixture a second polyol, in a proportion which is effective in reducing the surface friability of said foam, said second polyol characterized by having a hydroxyl number of about 100–800 and being an adduct of ethylene oxide and an amine selected from the group consisting of an aliphatic amine having 1–8 carbon atoms, an aromatic primary amine having 6–8 carbon atoms, an alkanolamine in which each alkanol group contains 2–5 carbon atoms, and a mixture thereof.

2. A polyurethane foam prepared by the process of claim 1.

3. The process of claim 1 wherein said amine is selected from the group consisting of ethylene diamine, toluene diamine, an ethanolamine, and a mixture thereof.

4. The process of claim 1 wherein said aliphatic amine is a diamine having 2–4 carbon atoms, said aromatic amine is toluene diamine, and said alkanolamine is an ethanolamine, a propanolamine or an ethanolpropanolamine.

5. A polyurethane foam prepared by the process of claim 1.

6. The process of claim 4 wherein said polyether polyol reactant is the product of condensing, in the presence of a Lewis acid catalyst, 4,4,4-trichloro-1,2-epoxybutane with a mixture of dextrose and an aliphatic diol or triol.

7. The process of claim 6 wherein said polyether polyol reactant has a hydroxyl number of about 260–550.

8. A polyurethane foam prepared by the process of claim 7.

9. The process of claim 7 wherein said second polyol has a hydroxyl number of about 250–600.

10. The process of claim 9 wherein said second polyol is employed in a proportion of about 10–40 parts per every 100 parts by weight of said polyether polyol reactant.

11. A polyurethane foam prepared by the process of claim 10.

12. The process of claim 10 wherein said Lewis acid catalyst is boron trifluoride or an etherate derivative thereof.

13. The process of claim 12 wherein the mixture used in preparing said polyether polyol reactant is a mixture of α-d-glucose monohydrate and ethylene glycol.

14. A polyurethane foam prepared by the process of claim 13.

15. The process of claim 13 wherein said reaction mixture comprises a silicon-based surfactant.

16. The process of claim 15 wherein said foaming agent is a halogenated hydrocarbon foaming agent and said organic polyisocyanate is toluene diisocyanate, polymethylene polyphenylisocyanate, or a mixture thereof.

17. The process of claim 16 wherein said amine is selected from the group consisting of ethylene diamine, toluene diamine, diethanolamine, and a mixture thereof.

18. A polyurethane foam prepared by the process of claim 17.

* * * * *